United States Patent [19]

Brandner et al.

[11] Patent Number: 5,066,864
[45] Date of Patent: Nov. 19, 1991

[54] STIMULABLE PHOSPHOR RADIATION IMAGE STORAGAE SCREEN HAVING AN ANTI-REFLECTION LAYER

[75] Inventors: Gerhard Brandner, Zirndorf; Peter Hoebel, Buckenhof, both of Fed. Rep. of Germany

[73] Assignee: Siemens Aktiengesellschaft, Munich, Fed. Rep. of Germany

[21] Appl. No.: 642,651

[22] Filed: Jan. 17, 1991

[30] Foreign Application Priority Data

Feb. 7, 1990 [EP] European Pat. Off. .......... 90102430

[51] Int. Cl.$^5$ .............................................. G03B 42/00
[52] U.S. Cl. ................................ 250/484.1; 250/327.2
[58] Field of Search ........... 250/327.2, 484.1, 484.1 B, 250/327.2 A, 327.2 D, 327.2 E

[56] References Cited

U.S. PATENT DOCUMENTS

| | | | |
|---|---|---|---|
| 3,859,527 | 1/1975 | Luckey | 250/327.2 |
| 4,380,702 | 4/1983 | Takahashi et al. | 250/327.2 |
| 4,645,721 | 2/1987 | Arakawa et al. | 250/327.2 X |
| 4,733,090 | 3/1988 | DeBoer et al. | 250/484.1 |
| 4,778,995 | 10/1988 | Kulpinski et al. | 250/327.2 |
| 4,999,505 | 3/1991 | Gasper et al. | 250/484.1 |

FOREIGN PATENT DOCUMENTS

| | | |
|---|---|---|
| 0174875 | 3/1986 | European Pat. Off. . |
| 0233497 | 8/1987 | European Pat. Off. . |
| 0369049 | 5/1990 | European Pat. Off. . |

*Primary Examiner*—Constantine Hannaher
*Attorney, Agent, or Firm*—Hill, Van Santen, Steadman & Simpson

[57] ABSTRACT

A stimulable phosphor luminescent storage screen of the type used for the latent storage of X-ray images, wherein read-out of the stored image ensues by exciting the phosphor with radiation of a first wavelength thereby causing radiation of a second wavelength to be emitted by the phosphor, has at least one optical surface coat layer for reducing reflections. The stimulable phosphor is transparent.

9 Claims, 1 Drawing Sheet

STIMULABLE PHOSPHOR RADIATION IMAGE STORAGAE SCREEN HAVING AN ANTI-REFLECTION LAYER

BACKGROUND OF THE INVENTION

1. Field of the Invention

The present invention is directed to a luminescent storage screen having a stimulable phosphor for the latent storage of x-ray images.

2. Description of the Prior Art

Luminescent storage screens are known in the art wherein a latent x-ray image is stored using a stimulable phosphor, with read-out of the x-ray image being achieved by exciting the phosphor with radiation of a first wavelength (stimulating radiation), which causes the phosphor to emit radiation of a second wavelength, which is acquired by a detector. Such a luminescent storage screen is disclosed, for example, in European Application 0 174 875.

A luminescent storage screen of this type employed in an image pick-up device is described in U.S. Pat. No. 3,859,527. In such an x-ray diagnostics installation, a luminescent storage screen, consisting of a luminescing stimulable phosphor which is irradiated with x-rays, is used as a radiation-sensitive transducer. Electronic holes are generated in the stimulable phosphor by the incident radiant intensity, these holes being stored in traps having a energy level, so that the latent x-ray image is stored in the screen.

For read-out, the entire area of surface of this screen, used as a master, is caused to luminesce pixel-by-pixel by an additional radiation source, which may be a laser. Due to the stimulating radiation, the energy of the holes stored in the traps is boosted and they can fall back into lower energy levels, whereby the energy difference is radiated in the form of light quanta. The stimulable phosphor thereby emits light dependent on the energy stored in the phosphor. The light emitted as a result of this stimulation is detected and rendered visible, so that the x-ray image which was latently stored in the screen can be read out.

A problem in the read-out of such conventional screens is that the stimulable phosphor is not sufficiently transparent for the laser light. A minimum thickness of the stimulable phosphor is required to be able to achieve adequate x-ray quantum absorptions. In the case of a non-transparent, tightly compressed or sintered phosphor, the laser beam is so greatly attenuated by the phosphor that the penetration depth of the laser beam is too small. Because the energy is no longer adequate for boosting the holes to the energy level required for quantum emission, the information stored in the deeper levels cannot be read out.

The storage screen disclosed in the European Application 0 174 875 has phosphor grains which are applied on a substrate enveloped by a binder. The binder serves the purpose of fixing the phosphor grains. A light-transmissive carrier material is usually employed as the binder, which is transparent both for the exciting laser light and for the emitted luminescent light. A problem associated with screens of this type, however, is that the laser beam spreads increasingly with increasing penetration depth, due to scattering of the beam at the phosphor grains, so that the modulation transfer function of the overall system is degraded. A storage screen in binder technology also has poorer quantum x-ray quantum absorption, compared to a layer of comparable thickness of the stimulable phosphor.

It is preferable, however, to vapor-deposit the stimulable phosphor onto a carrier in a high vacuum, and to temper the phosphor in a protective gas atmosphere, or in the vacuum, or to compress the phosphor under vacuum and/or heating, as disclosed in European Application 0 369 049. It is also possible to reshape single crystals of stimulable phosphor to the large area required for medical diagnostics by compressing such crystals. The latter methods yield transparent stimulable phosphor panels. The advantage of the transparency is that the stimulating laser beam cannot be spread in the storage medium due to scattering at the grains of the material. Such spreading of the read-out beam, as noted above, considerably degrades the modulation transfer function of the overall system. Spreading of the laser beam upon transirradiation of the storage medium is greatly diminished by using a transparent stimulable phosphor manufactured, for example, by compressing the phosphor powder.

The problem of reflection of the exciting, electromagnetic radiation having a first wavelength at the back side of the stimulable phosphor layer arises to a far greater degree than in the case of non-transparent layers. This problem is explained in detail with reference to FIG. 1. For pixel-by-pixel read-out of the x-ray image, the stimulating beam 6, having a first wavelength, penetrates the luminescent storage screen 1 which, for example, may be composed of a carrier and a binder having a stimulable phosphor applied thereon, or may be composed of a single crystal. The radiation is incident on the stimulable phosphor causing the phosphor to emit radiation 9, at a second wavelength, as a result of the above-described excitation. Upon emergence of the beam 6 from the storage screen 1, radiation 7, which in turn are incident or phosphor particles, are reflected back into the screen 1, and thus emit radiation 8, having the second wavelength, again due to excitation. The radiation 8 and the radiation 9 emerge from the storage screen 1, and are acquired by a detector (not shown). As a result, the detector also receives the radiation 8, which are allocated to different locations of the storage screen 1 than those which are to be read, the radiation 8 arriving at the detector either earlier or later than the radiation 9. Information in the form of radiation, which does not belong to the pixel currently being scanned by the beam 6, thereby degrades the resolution of the resultant image because the radiation 8 degrade the signal-to-noise ratio as background radiation.

SUMMARY OF THE INVENTION

It is an object of the present invention to provide a luminescent storage screen of the type described above which has a high x-ray quantum absorption and high imaging sharpness and a good modulation transfer function, and wherein the disturbing influences of reflections are avoided.

The above object is achieved in accordance with the principles of the present invention in a storage screen having at least one optical surface coating layer. As a result of this layer, reflections which occur given the emergence of the read-out radiation, having a first wavelength, from the storage medium are either reduced or entirely prevented.

The action of the surface coating layer takes full effect when the stimulable phosphor is transparent in the region of both wavelengths. Specifically, the reflections of the exciting radiation are prevented when the surface coating layer is effective at least for the radiation having the first wavelength. It is preferable that the anti-reflection layer be applied to that side of the storage screen facing away from the detector. The light yield can be increased if a wavelength-selective mirror is used as the anti-reflection layer, the wavelength-selective mirror being applied to the side of the storage screen facing away from the detector. The wavelength-selective mirror forms an anti-reflection layer for the radiation having a first wavelength, and forms a reflection layer for the radiation having a second wavelength. Thus, the exciting radiation emerges from the storage luminescent screen without reflections, whereas the excited radiation is reflected in the direction of the detector, so that this reflected radiation can contribute to the detected signal.

The wavelength-selective mirror is applied to that side of the storage screen from which the radiation of the first wavelength emerges. A complete reception of the excitation radiation into the storage screen, and an optimally complete emergence of the excited radiation, ensues when the front side of the storage screen is provided with an anti-reflection coating.

Acquisition of the read out reflected radiation can ensue when the wavelength-selective mirror is applied to that side of the luminescent storage screen from which the radiation having the first wavelength emerges. A complete entrance of the excitation radiation into the storage screen, and an optimally complete emergence of the excited radiation, ensues when the front side of the storage screen is provided with an anti-reflection coat.

Acquisition of the excited radiation in transmission can ensue when the wavelength-selective mirror is applied to that side of the storage screen into which the radiation of the first wavelength enters, and when an anti-reflection coat is disposed at the opposite side.

DESCRIPTION OF THE PREFERRED EMBODIMENTS

Figure 1:
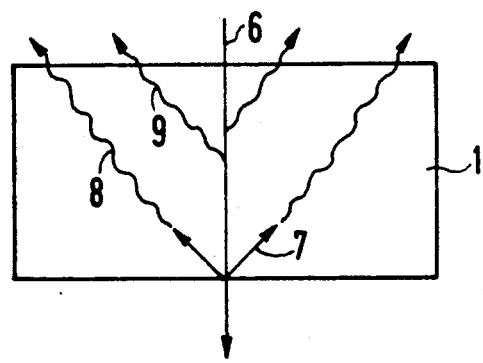
FIG. 1 is a side view of a luminescent storage screen of the type known in the prior art.
Figure 2:
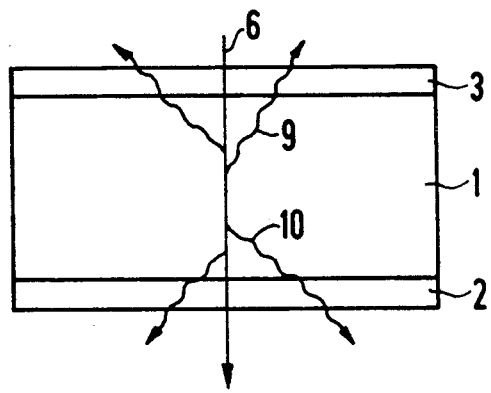
FIGS. 2, 3 and 4 are respective side views of different embodiments of a storage luminescent screen having various surface-coat layers constructed in accordance with the principles of the present invention.

A luminescent storage screen 1 constructed in accordance with the principles of the present invention is shown in FIG. 2 into which an exciting (stimulating) beam 6 penetrates, having a first wavelength. An anti-reflection coat 2 is applied to the back side of the storage luminescent screen 1, i.e., to that side at which the beam 6 emerges from the storage screen 1. The anti-reflection coat 2 prevents reflection of the beam at the transition boundary. As a result, the beam 6 emerges unimpeded and without reflection. Within the storage 1, the beam 6 excites the phosphor pixel-by-pixel, causing the emission of radiation 9 and 10.

A detector which receives the emitted light can thus be disposed either at the front side of the storage screen 1, i.e., the side of the entry of the beam 6 into the storage screen 1, to receive the radiation 9, or can be arranged at the back side of the storage screen 1 for detecting the radiation 10. It is also possible to use two detectors respectively disposed at both sides of the storage screen 1. A broadband anti-reflection coat 3 can be additionally provided at the front side of the storage screen 1, so that the exciting beam 6 can be coupled into the storage screen 1 as completely as possible, and the emitted radiation 9 can emerge as completely as possible.

Figure 3:
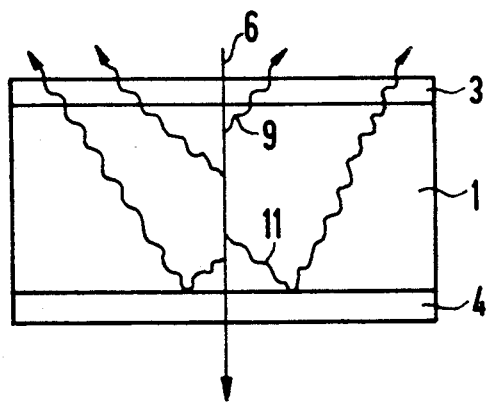

A further embodiment of a luminescent storage screen 1 constructed in accordance with the principles of the present invention is shown in FIG. 3, which is read out in reflection. A wavelength-selective mirror 4, which forms an anti-reflection coat for the radiation 6 having the first wavelength and forms a reflection coat for the radiation 11 having a second wavelength, is applied to the back side of the storage screen 1. As a result, not only the radiation 9, but also the radiation 11, proceed to that side of the storage screen 1, so that only one detector is needed to acquire all of the emitted radiation 9, 10 and 11. In this embodiment as well, the storage screen 1 is provided with an anti-reflection coat 3.

Figure 4:
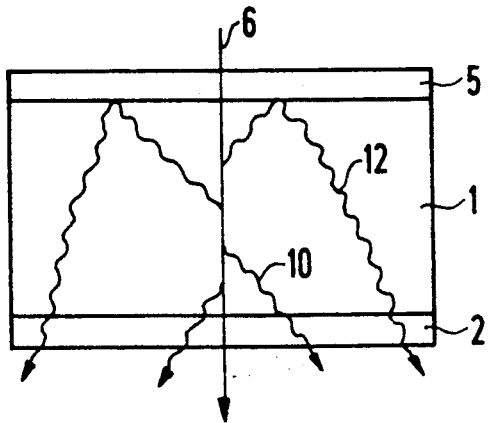

A further embodiment of a storage screen 1 constructed in accordance with the principles of the present invention is shown in FIG. 4, wherein read-out ensues in transmission, i.e. at the back side of the storage screen 1. In this embodiment, the storage screen 1 is provided with a wavelength-selective mirror 5 at the entry side of the beam 6, the wavelength-selective mirror 5 acting as anti-reflection coat for the beam 6 and as a reflection coat for the emitted radiation 12. The back side of the storage screen 1 is provided with an anti-reflection coat 2, so that both the beam 6 and the radiation 10 and 12 emerge unreflected from the storage screen 1, and the radiation 10 and 12 can be completely acquired by a detector.

A transparent panel of, for example, rubidium bromide (RbBr) can be used as the stimulable phosphor for the storage screen 1, being doped with thallium bromide (TlBr) in a ratio of 0.01 through 1 molecular percent. The read-out of the stored information can ensue with a beam 6 of a HeNe laser having a wavelength of 633 nm. The emitted radiation 8 through 12 will thereby have a wavelength of 400 through 420 nm. The laser beam 6 is focused, for example, to a width of 50 $\mu$m. The detector and the laser are situated at the same side of the storage screen 1, so that read-out ensues in reflection. The other side of the storage screen 1 is vapor-deposited with a wavelength-selective mirror 4 in a high-vacuum, the wavelength-selective mirror 4 having a high transmission for electromagnetic radiation having the wavelength 633 nm (for example, >99%), and simultaneously having a high reflection for a wavelength range from 400 through 420 nm (for example, >90%). Such a beam splitter, for example, may be composed of a multilayer system of cryolite $Na_3AlF_6$ and ZnS. The number and the grid layers must be optimized to the wavelengths of the electromagnetic radiation to be separated.

A luminescent storage screen is obtained in accordance with the above which, due to the use of a transparent stimulable phosphor, has a high x-ray quantum absorption and good imaging sharpness and a good modulation transfer function, and disturbing influences of reflections are avoided by employing the surface coat layers 2 through 5.

Although modifications and changes may be suggested by those skilled in the art, it is the intention of the inventors to embody within the patent warranted hereon all changes and modifications as reasonably and properly come within the scope of their contribution to the art.

We claim as our invention:

1. A luminescent storage screen for storing latent x-ray images, said storage screen being read-out by excitation with stimulating radiation having a first wavelength, said storage screen comprising:
   a stimulable phosphor in which said x-ray image is latently stored which is reactive to said radiation of first wavelength to emit radiation of a second wavelength; and
   at least one optical layer coating a surface of said stimulable phosphor layer for reducing reflections at least of said radiation having said first wavelength and being highly transmissive at least for said radiation having said first wavelength.

2. A luminescent storage screen as claimed in claim 1 wherein said stimulable phosphor is transparent to radiation of said first and second wavelengths.

3. A luminescent storage screen as claimed in claim 1 for use with a detector for said radiation of second wavelength, and wherein said optical layer is an anti-reflection coat applied to a side of said storage screen facing away from said detector.

4. A luminescent storage screen as claimed in claim 1 for use with a detector for said radiation of second wavelength, wherein said optical layer is a wavelength-selective mirror applied to side of said luminescent storage screen facing away from said detector, said wavelength-selective mirror forming an anti-reflection coat for said radiation of said first wavelength and forming a reflection layer for said radiation of said second wavelength.

5. A luminescent storage screen as claimed in claim 4 wherein said wavelength-selective mirror is applied to a side of said luminescent storage screen from which said radiation having said first wavelength emerges.

6. A luminescent storage screen as claimed in claim 5 further comprising an anti-reflection coat disposed on a side of said luminescent storage screen opposite to said side of said luminescent storage screen from which said radiation having said first wavelength emerges.

7. A luminescent storage screen as claimed in claim 4 wherein said wavelength-selective mirror is applied to a side of said luminescent storage screen into which said radiation of said first wavelength enters, and further comprising an anti-reflection coat arrnged on an opposite side of said luminescent storage screen.

8. A luminescent storage screen as claimed in claim 1 wherein said optical layer is a multi-layer system.

9. A luminescent storage screen as claimed in claim 8 wherein said multi-layer system is composed of cryolite $Na_3AlF_6$ and $ZnS$.

* * * * *